Patented Aug. 29, 1933

1,924,396

UNITED STATES PATENT OFFICE 1,924,396

PLASTIC AND RESINOUS COMPOSITIONS OF MATTER AND METHOD OF MAKING SAME

Thomas S. Carswell, Kirkwood, Mo., assignor, by mesne assignments, to Monsanto Chemical Company, a corporation of Delaware No Drawing. Application November 27, 1929
Serial No. 410,254

3 Claims. (Cl. 106—22)

This invention relates to the manufacture of plastic and resinous compositions, such as are employed in the manufacture of films, coating and moulding compositions, impregnating compositions, etc. composed of alkyd resins which have as their base polyhydric-alcohol-carboxylic-acid reaction products. The invention has particular application to the processing or compounding of the compositions by which the physical and chemical properties thereof are rendered most suitable to the uses to be made of the ultimate product.

One of the important constituents which are added to resinous compositions referred to above is one generally designated by the terms "plasticizer" or "softener". Among the materials which have been suggested to serve this function heretofore include the phthalate esters, such as dibutyl phthalate and diethyl phthalate, the aromatic sulphamides, the esters of aliphatic acids including lactic, tartaric, abietic and many others. For various reasons these plastic compositions have not proved entirely satisfactory. In some instances the compositions are too expensive or are not compatible to a sufficient degree, in others the compositions "sweat out" of the product.

I have found that the ester-like bodies of aromatic sulphonic acids are excellent plasticizers for the resinous compositions mentioned above and particularly for those of the alkyd class. Specific examples of this class of organic compositions include: ethyl para toluene sulphonate, butyl para toluene sulphonate, phenyl sulphonate, the ethylene glycol ester of dibenzene sulphonate, the para toluene sulphonic acid ester of the mono methyl ether of ethylene glycol, the mixed cresyl esters of paratoluene sulphonic acid, and the benzyl ester of benzene sulphonic acid. From the specific compositions which are hereinbefore set forth it will be apparent that the present invention contemplates a broad class of ester compositions which may be used as plasticizers or softeners in the manufacture of resinous compositions and may be represented structurally thusly: R'SO$_2$OR, where R' is an aromatic nucleus such as benzene toluene or substituted radicals falling within this class and OR is the radical of an aromatic alcohol and may include phenol, cresol, or their homologues or derivatives, capable of combining with an aromatic sulphonic acid to form ester-like bodies.

The manner in which the plasticizers are employed depends to a large extent upon the use to be made of the ultimate product. For example, in some instances the composition is heated to its fusible stage, as when it is employed in moulded products. On the other hand when the materials are to be utilized as coating compositions or films the resin is employed in its soluble or distinctly fusible stage. The manner of applying the invention in each specific case is well understood to those skilled in the art after having identified this class of compositions as being possessed of valuable plasticizing properties.

To illustrate the manner in which the plasticizers may be employed to advantage, specific examples are hereinafter set forth.

*Example 1.*—Approximately 100 parts of glycerol phthalate resin, which is still in the fusible stage are melted and mixed with 30 parts of phenyl benzene sulphonate, a homogeneous mixture results which is distinctly fluid and can be poured easily at a temperature of about 140° C. The mixture may be converted into its infusible form by maintaining the same at 180° C. for three hours. If desired the period of heating may be shortened by employing higher temperatures and applying pressure thereto if necessary. The resulting product is clear, light in color, extremely tough and is otherwise possessed of the properties which render it suitable for many varied purposes.

*Example 2.*—An equivalent amount of the ester formed by the reaction of the mono methyl ether of ethylene glycol and para toluene sulphonic acid is substituted for the phenyl benzene sulphonate in Example 1. The resulting product will likewise be found to have the desirable properties which characterize the product made with the phenyl benzene sulphonate.

*Example 3.*—A desirable phenol-aldehyde composition may be prepared by mixing approximately 30 parts of ethyl para toluene sulphonate with a molten mass of approximately 100 parts of phenolformaldehyde condensation product. The materials are easily compatible; uniform distribution of the sulphonate through the mass is realized after agitating for but a short period of time. The resulting mixture may be rendered infusible in the usual manner.

It will be apparent that if desired fillers, catalysts, accelerators or coloring matter, as well as other materials may be added to the resin to modify or enhance the desirable properties of the final product. Moreover, the specific procedure set forth above is simply exemplary of one method of employing plasticizers. As is well known to those skilled in the art, the manner of employing plasticizers is dependent to a large extent on the nature of the product which is being made. Under the circumstances the invention herein will be understood to consist in the disclosure of a new class of plasticizing compositions for resinous or plastic bodies whether used alone or in combination with other plasticizers or modifying agents and whether the resin is the reaction product of a single class of organic compositions or a mixture of several compositions.

Attention is hereby drawn to applicant's copending divisional application Serial No. 675,464, which is directed to subject matter which has been divided out of this application.

What I claim is:
1. A glycerol phthalic anhydride resin in which there has been incorporated a neutral phenyl benzene sulphonate.
2. A composition of matter which includes a polyhydric-alcohol-polybasic-acid reaction product admixed with a neutral phenolic ester of an aromatic sulfonic acid.
3. A composition of matter which includes a polyhydric-alcohol-polybasic-acid reaction product admixed with a neutral ester of a toluene sulfonic acid and a phenol.

THOMAS S. CARSWELL.